US012737731B2

(12) United States Patent
Subramanian

(10) Patent No.: US 12,737,731 B2
(45) Date of Patent: Sep. 15, 2026

(54) COMMERCIAL VEHICLES ROTOR CRACKING PREDICTION USING RECURRENT NEURAL NETWORK

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 100 days.

(21) Appl. No.: 18/043,202

(22) PCT Filed: Sep. 10, 2020

(86) PCT No.: PCT/US2020/050183

§ 371 (c)(1),
(2) Date: Feb. 27, 2023

(87) PCT Pub. No.: WO2022/055488

PCT Pub. Date: Mar. 17, 2022

(65) Prior Publication Data

US 2023/0334435 A1 Oct. 19, 2023

(51) Int. Cl.
*G06Q 30/00* (2023.01)
*B60T 17/22* (2006.01)
*G06Q 10/20* (2023.01)

(52) U.S. Cl.
CPC .............. *G06Q 10/20* (2013.01); *B60T 17/22* (2013.01)

(58) Field of Classification Search
None
See application file for complete search history.

(56) References Cited

U.S. PATENT DOCUMENTS 5,904,215 A 5/1999 Ikeda
2008/0033898 A1 2/2008 Hashimoto
2018/0134161 A1* 5/2018 Gaither ..................... B60L 7/26
2019/0093722 A1* 3/2019 Patel ....................... B60T 8/885
2019/0101175 A1 4/2019 Chandrasekara et al.
2019/0107163 A1* 4/2019 Medinei ................ F16D 66/026
(Continued)

FOREIGN PATENT DOCUMENTS

DE 102017200372 A1 7/2018

OTHER PUBLICATIONS

Simulation Methods for Vehicle Disc Brake Noise, Vibration and Harshness by Mohammad Esgandari, Aug. 2014 (Year: 2014).*
(Continued)

*Primary Examiner* — Matthew T Sittner
(74) *Attorney, Agent, or Firm* — Jeffri A. Kaminski; Venable LLP

(57) ABSTRACT

Systems, methods, and computer-readable storage media for training a Recurrent Neural Network to evaluate sensor data related to a brake rotor, then diagnosing brake rotors using sensor data and the trained Recurrent Neural Network. Sensor data can include audio data, temperature data, caliper pressure data, and/or any other data related to operation of the brake rotor being evaluated. When a processor is configured to execute the trained Recurrent Neural Network, sensor inputs can be provided to the processor, with the output being a diagnosis of the brake rotor state.

16 Claims, 5 Drawing Sheets

(56) References Cited

U.S. PATENT DOCUMENTS

2019/0389446 A1 12/2019 Du et al.
2021/0088094 A1* 3/2021 Kane ....................... B60T 17/22

OTHER PUBLICATIONS

Stender et al. "Deep learning for brake squeal: Brake noise detection, characterization and prediction", Mechanical Systems and Signal Processing, Elsevier, Amsterdam, NL, vol. 149, Aug. 14, 2020 (Aug. 14, 2020) (Year: 2020).*

Ghadimi B. et al: "Heat flux on-line estimation in a locomotive brake disc using artificial neural networks", International Journal of Thermal Sciences., vol. 90, Apr. 1, 2015 (Apr. 1, 2015) (Year: 2015).*

International Search Report and Written Opinion of the International Searching Authority in corresponding International Application No. PCT/US2020/050183 mailed Jun. 28, 2021 (12 pages).

Merten Stender et al; "Deep learning for brake squeal: Brake noise detection, characterization and prediction", Mechanical Systems and Signal Processing; vol. 149, Feb. 15, 2021, 107181; XP086336063; DOI: 10.1016/J.YMSSP.2020.107181; external link ISSN:0888-3270; 40 pages.

B. Ghadimi et al; "Heat flux on-line estimation in a locomotive brake disc using artificial neural networks", International Journal of Thermal Sciences vol. 90, Apr. 2015, pp. 203-213; XP055813754; DOI: 10.1016/j.ijthermalsci.2014.12.012 external link; ISSN:1290-0729; 11 pages.

* cited by examiner

COMMERCIAL VEHICLES ROTOR CRACKING PREDICTION USING RECURRENT NEURAL NETWORK

CROSS-REFERENCE TO RELATED APPLICATIONS

This application is a U.S. National Stage application of PCT/US2020/050183, filed Sep. 10, 2020 and published on Mar. 17, 2022, as WO 2022/055488, all of which is hereby incorporated by reference in its entirety.

BACKGROUND

1. Technical Field

The present disclosure relates to predicting brake rotor status on vehicles, and more specifically to using a recurrent neural network to identify a status of the brake rotors on a vehicle as the vehicle travels.

2. Introduction

Vehicle brake design continues to change in order to meet braking capabilities of vehicles travelling at higher speeds and with higher loads. Commercial vehicles are usually equipped with air brake systems, which use pneumatics to provide the braking force. For example, in an air disc braking system, compressed air actuates a piston in the brake caliper, squeezing the brake pads against the rotor. Although brake rotors have good thermal dissipation characteristics, there are certain brake rotor designs which develop high thermal stress, resulting in internal cracking within the brake rotor which is not visible during visual inspection.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are methods, vehicles, and non-transitory computer-readable storage media which provide a technical solution to the technical problem described. A method for performing the concepts disclosed herein can include: training a recurrent neural network using a plurality of known brake rotor statuses which respectively correspond to a plurality of training brake rotors, wherein each known brake rotor status in the plurality of known brake rotor statuses comprises: a known condition of a corresponding training brake rotor from the plurality of training brake rotors, the known condition being one of a plurality of possible brake rotor conditions; a natural frequency of the corresponding training brake rotor from the plurality of training rotors; and a temperature distribution of the corresponding training brake rotor from the plurality of training rotors; and uploading the recurrent neural network to a non-transitory memory device in communication with a processor of a vehicle, wherein the vehicle: comprises at least one brake rotor; and has a plurality of sensors monitoring the at least one brake rotor; and wherein the processor of the vehicle: receives sensor signals from the plurality of sensors while the vehicle is moving; evaluates the sensor signals using the recurrent neural network, resulting in an evaluation; and determines a brake rotor status for each at least one brake rotor based on the evaluation.

A vehicle configured to perform the concepts disclosed herein can include: at least one brake rotor; a plurality of sensors associated with the at least one brake rotor; a processor; a non-transitory computer-readable memory device having stored therein: a recurrent neural network; and instructions which, when executed by the processor, cause the processor to perform operations comprising: receiving, from the plurality of sensors, sensor signals from the plurality of sensors while the vehicle is moving; evaluating the sensor signals using the recurrent neural network, resulting in an evaluation; and determining a brake rotor status for each brake rotor in the at least one brake rotor based on the evaluation.

A non-transitory computer-readable storage medium configured as disclosed herein can have stored: a recurrent neural network; and instructions which, when executed by a processor, cause the processor to perform operations comprising: receiving, from a plurality of sensors recording data associated with at least one brake rotor of a vehicle, sensor signals from the plurality of sensors while the vehicle is moving; evaluating the sensor signals using the recurrent neural network, resulting in an evaluation; and determining a brake rotor status for each at least one brake rotor based on the evaluation.

DETAILED DESCRIPTION

Figure 1:
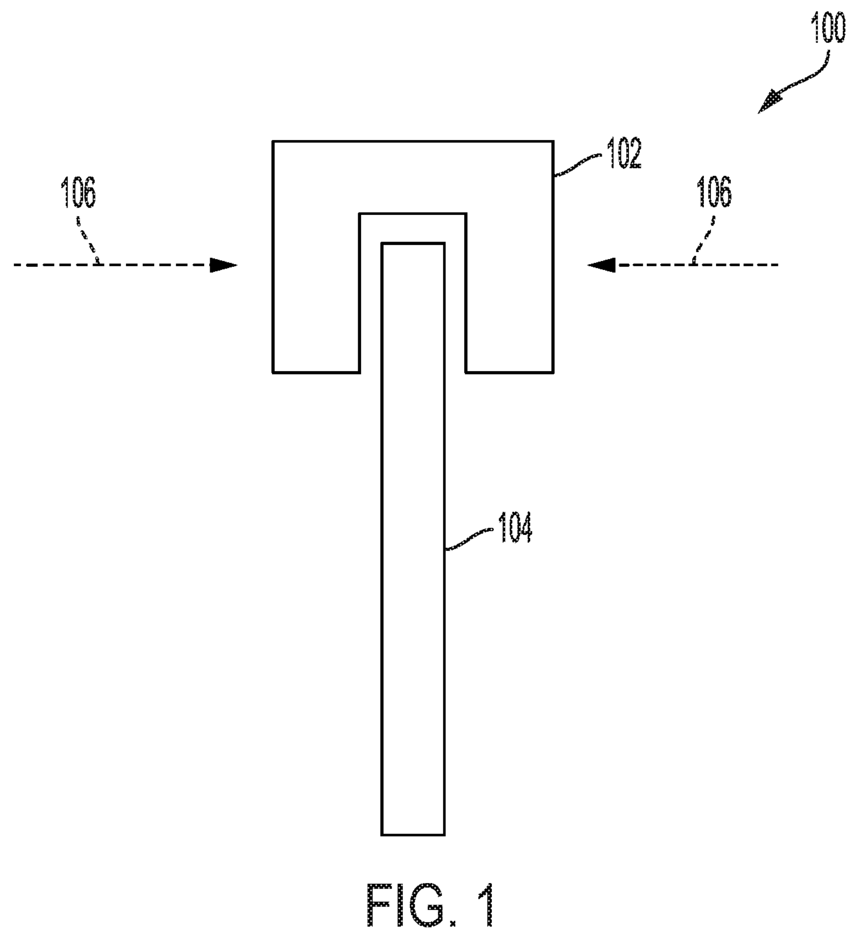
FIG. 1 illustrates an example brake rotor and caliper system from a first perspective.

Various embodiments of the disclosure are described in detail below. While specific implementations are described, it should be understood that this is done for illustration purposes only. Other components and configurations may be used without parting from the spirit and scope of the disclosure.

Identifying internal cracks within a vehicle brake rotor can be difficult when those cracks are not visible, and detection is further impeded when a vehicle is traveling. The disclosed systems, methods, and non-transitory computer-readable media describe concepts which enable the detection of both internal and external cracks of a vehicle brake rotor, as well as the propagation of those cracks, while in transit (in steady state or undergoing braking, so long as the wheel is spinning). During development this is accomplished by training a recurrent neural network using data from vehicles having known brake rotor conditions, then uploading the trained recurrent neural network to computer systems aboard vehicles. In some cases, the known brake rotor conditions can be intentionally created by creating the cracks and quantifying the cracks using ultrasonic waves. A recurrent neural network ("RNN") is a class of neural network which allows previous outputs to be used as inputs, while also having the possibility of hidden states. The connections between nodes of the RNN form a directed graph along a temporal sequence, which allows the RNN to exhibit temporal dynamic behavior.

Sensors aboard the vehicle, such as accelerometers, microphones, and thermometers, can record data associated with the brake rotors, input the recorded data to the RNN within a computer system, and identify a current status one or more brake rotors aboard the vehicle based on the sensor data. The recording of data, and subsequent identification of the current status of the rotors, occurs while the wheel is spinning, in either a steady state or while the wheel is undergoing braking.

As an example of how to train the RNN, a vehicle manufacturer or other entity can collect sensor data for known brake rotor conditions and/or known operating conditions. For example, there may be vehicles with new, undamaged brake rotors; vehicles with brake rotors containing internal cracks; vehicles with brake rotors containing surface cracks; vehicles with cracked and broken brake rotors; and/or vehicles with brake rotors having other known conditions. Likewise, the vehicle may be under operating conditions such as operating in a steady state, having different steering inputs, being in a transient state (acceleration, braking, and/or cornering), etc. The vehicle manufacturer can collect sensor data from the vehicles having known brake rotor conditions while the vehicle is driven and/or tested. Preferably, the amount of data collected from each vehicle would be at least thirty minutes of operation, though the amount of data can vary. Sensor data collected can include audio data collected by microphones recording sounds, for example, generated by the brake rotor; thermal data of the brake rotor collected by a thermometer; horizontal and/or vertical acceleration experienced by the brake rotor, collected by an accelerometer associated with the brake rotor (such as being located on the brake rotor or on a brake caliper associated with the rotor); caliper pressure placed on the brake rotor, collected by a caliper pressure monitor of the brake caliper on a respective brake rotor; and/or other sensors, etc. Additional collected data can be environmental or other test conditions.

The sensor data from multiple vehicles and/or multiple brake rotors with known conditions (such as Good, Internal crack—low, Internal crack—mid, External crack—low, External crack—high), as well as non-sensor data such as vehicle operating states (such as velocity, brake input, tire psi, steering input, throttle input, road conditions), test conditions, environmental data, etc., may then compared using a sensitivity analysis to identify which features should be input to a machine learning algorithm which outputs the RNN. For example, the sensitivity analysis can execute algorithms (such as a one-at a time test, a derivative-based local method, regression analysis, variance-based method, screening, scatter plots, etc.) to identify how a given input/variable affects the likelihood of a specific condition in the brake rotor being found. Moreover, because the sensor data being used to train the RNN is temporal, the sensitivity analysis can identify inputs which, when detected at a first time when the brake rotor is in a first condition, may result in increased likelihood of a different condition at a second time. For example, the sensitivity analysis may determine that if a brake rotor having some internal cracking is exposed to temperature above 50 degrees Celsius (122 degrees Fahrenheit), it may be significantly more likely to develop exterior cracking within thirty minutes.

As an example, the system can receive accelerometer data and/or tire pressure data. If those variables vary significantly due to the road condition (such as dry, wet, or mud) even though the rotor is the same (not cracked), then this is highly sensitive parameter and therefore this parameter should be included as a feature in the RNN. As additional types of data are collected and sensitivity analyses performed on that data, the sensitivity analysis can identify what types of data would be most helpful in predicting brake rotor status, and by extension what additional sensors would be helpful to collect that additional data. For example, if temperature near the brake rotor affects the two main sensors collecting data from the brake rotor, then that sensitivity to temperature by those sensors indicates that a temperature sensor is needed in the vehicle and that the collected temperature is a feature which also needs to be included in the model.

The outputs of the sensitivity analysis, as well the combined training data, can then be used by the machine learning algorithm to output the RNN. For example, test data associated with the factors identified by the sensitivity analysis can be input into Python, MatLab®, or other development software configured to construct an RNN based on factor-specific data. Depending on the specific scenario, users can adjust the RNN construction by selecting from optimization methods including (but not limited to) the least-squares method, the Levenberg-Marquardt algorithm, the gradient descent method, or the Gauss-Newton method. The RNN can make predictions of the current and future status of brake rotors on a vehicle based on current and past conditions.

In some cases, the data fed to the development software has been pre-filtered in a particular way. For example, the time-domain data captured can be converted to frequency-domain data using a Fast Fourier Transform (FFT). That frequency domain data can then be filtered for white noise/analyzed for power spectral density using Welch's method (for example, by using the pwelch function in Matlab®). In other cases, white noise or other non-relevant data can be filtered using other algorithms which smooth/average the data. The resulting filtered data, power spectral density, the frequency-domain data, and/or the time-domain data can then be input into the development software for construction of the RNN.

When executed by a processor and fed sensor data of a rotor, the RNN can output a current condition of the brake rotor. For example, once the RNN is trained, it can be loaded into the memory of a computer system, then executed by a processor of that computer system. If the computer system is aboard a vehicle, the sensors associated with each respective brake rotor can collect data on a continuous basis as the vehicle is in operation, feed that sensor data to the RNN processor, and the RNN can provide a current status of the respective brake rotors based on the sensor data collected. In this manner, a near-real time knowledge of the status of brake rotors can be obtained as the vehicle is being operated or while in transit. In some configurations, a warning light or other notification system can indicate to the driver the status of the vehicle brake rotors.

In other configurations, the sensor data can be collected over a period of time while the vehicle is in operation. Upon arriving back at a base location, the sensor data can be transmitted to a receiving computer system which has stored the trained RNN. The receiving computer system can then analyze the collected sensor data using the RNN and determine a current status of the brake rotors of the vehicle. The status of the brake rotors can then be communicated or otherwise shared with drivers, maintenance personnel, etc.

These and other configurations will be further described using the figures. FIG. 1 illustrates an example brake rotor 104 and caliper 102 system from a first perspective 100. As the driver of a vehicle presses on the brake pedal (or otherwise engages the brakes), the caliper 102 moves the brake pads to provide a force 106 on the brake rotor 104, creating friction which slows the vehicle. Sensors collecting data associated with the brake rotor 104 status can be located on or near to the brake rotor 104 and caliper 102.

Figure 2:
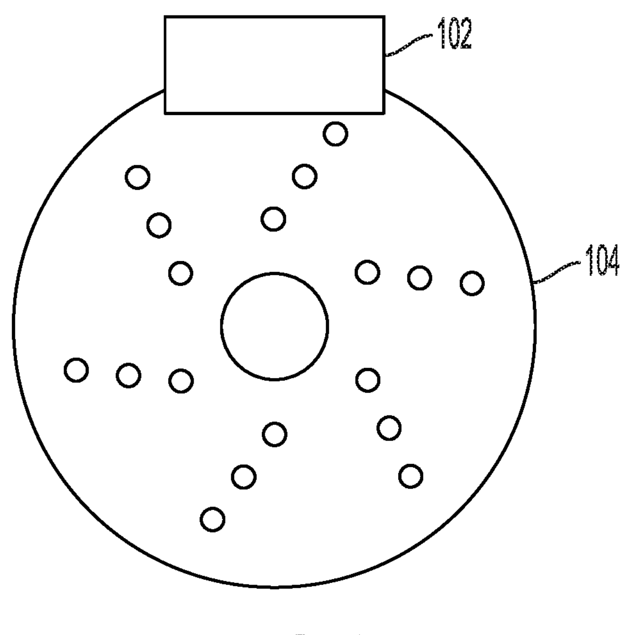
FIG. 2 illustrates the example brake rotor and caliper system from a second perspective.

FIG. 2 illustrates the example brake rotor 104 and caliper 102 system of FIG. 1 from a second perspective.

Figure 3:
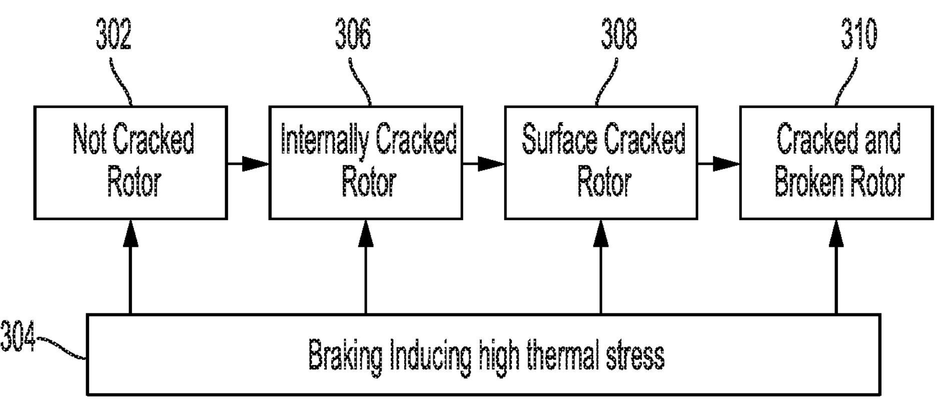
FIG. 3 illustrates an example of brake rotor deterioration.

FIG. 3 illustrates an example of brake rotor deterioration. Brake rotors generally deteriorate as illustrated, from a Not Cracked Rotor 302, to an Internally Cracked Rotor 306, to a Surface Cracked Rotor 308, to a Cracked and Broken Rotor 310. Generally, the progression from one stage of brake rotor deterioration to another is caused by thermal stress 304 from the friction of the braking system (the caliper system) on the brake rotor.

Figure 4:
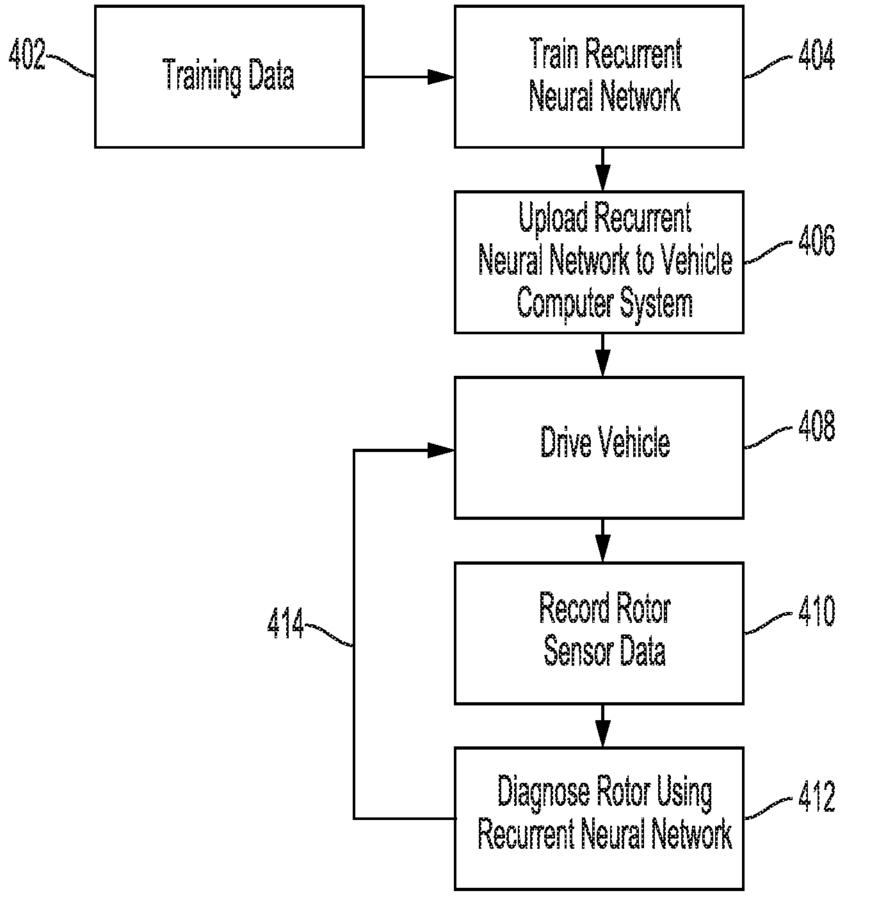
FIG. 4 illustrates an example of training a recurrent neural network and iterative testing of a brake using the trained recurrent neural network.

FIG. 4 illustrates an example of training a recurrent neural network (RNN) and iterative testing of a brake using the trained recurrent neural network. Training of the RNN occurs using training data 402, the training data 402 including sensor data associated with brake rotors having a known status. For example, the sensor data can include audio data, thermal data, acceleration data, and/or induced pressure data for a given brake rotor with a known status or with a status determined prior to use of the sensor data. The training data is preferably from multiple vehicles and multiple brake rotors, which is combined and used to train the RNN 404.

Once trained, the RNN is loaded on to a computer system for example, to a vehicle's computer system 406. For example, the RNN can be stored within non-transitory memory which is part of a computer system aboard a vehicle, with a processor of the computer system able to access the non-transitory memory and execute the RNN using vehicle sensor data as inputs to the RNN. As the vehicle is driven 408, the vehicle can record sensor data 410 associated with respective brake rotors of the vehicle. That sensor data can then be fed to the processor executing the RNN, and the processor can diagnose the brake rotor status using the RNN 412. For example, the processor can determine, using the RNN, if the brake rotor is completely intact, has internal cracking, has surface cracking, or is broken.

The testing/diagnosis 412 of the brake rotor can occur iteratively, with the newly collected data 410 being added to previously collected data, then the combined data being fed as input into the RNN. In some configurations, older data can be removed from the combined/total data being input into the RNN. In this manner, the system can collect a predetermined amount of data, or data covering a predetermined amount of time. The collection of data 410 and subsequent diagnosis 412 can occur on a given frequency (for example, every 0.5 seconds) or only when certain conditions are met (such as a certain level of pressure being created by the brake caliper, when the temperature is at a certain level, and/or the vehicle is in operation).

In providing the training data to the development software to form the RNN, the accuracy of the RNN depends on the amount of training data provided. For example, 1 minute of temporal data from 10 sources might provide 98% accuracy, whereas 20 seconds of temporal data from the same 10 sources might provide 80% accuracy. However, formation of RNN's can require non-linear amounts of processing time, such that a 3× increase in the amount of temporal data (for example, increasing from 20 seconds to 1 minute) may increase the amount of processing time for the formation of the RNN significantly more than 3×. In addition, there can exist saturation points, where additional data results in minimal increases in accuracy despite significant increases in processing time required to form the RNN. To form the RNN in the most efficient manner, the saturation point for a given number of factors should be identified, and in subsequent iterations that amount of data can yield the desired accuracy using the least amount of needed data.

Figure 5:
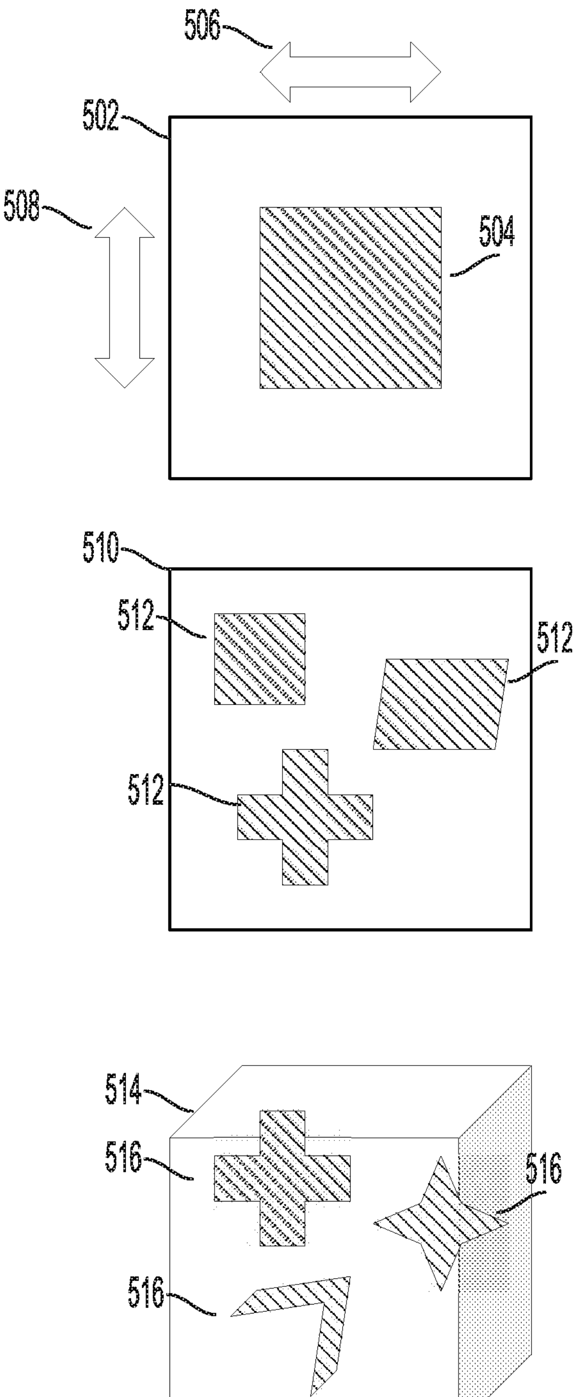
FIG. 5 illustrates examples of multi-dimensional boundary conditions.

FIG. 5 illustrates examples of multi-dimensional boundary conditions. The recurrent neural network can define multidimensional boundary conditions for each of the plurality of possible brake rotor conditions. For example, rather than a singular boundary condition indicating an internally cracked brake rotor, such as an audio level being above a threshold value, the multidimensional boundary condition can identify an internally cracked rotor when the temperature distribution of the brake rotor meets a first threshold while the audio data meets a second threshold. However, in some configurations, the thresholds themselves can vary based on data. For example, in a first case with first temperature data an audio level data of 5 dB may indicate a sound brake rotor with no internal cracks, but in a second case with second temperature data audio level data of 5 dB may indicate severe internal cracking.

FIG. 5 first illustrates an example 502 of a two dimensional boundary condition 504, where the specific ranges 506, 508 of each input are defined, such that determination if the boundary is met can be readily determined. However, the second example 510 illustrates another two dimensional set of conditions, however in this case the boundaries 512 are non-contiguous and would be more difficult to interpret. In the third example illustrates three dimensional boundary conditions, where boundaries 516 can extend in multiple dimensions.

In reality, the number of features used to generate the RNN model defines the number of dimensions used to define boundary conditions. For example, the features used to train the RNN could include: (1) Driving Condition (such as throttle, brake, and steering); (2) Road Surface type; (3) Normal Load; (4) Tire Pressure; (5) Vehicle Velocity; (6) Brake Type; (7) Accelerometer; (8) Rotor Pressure; (9) Microphone input; and (10) Temperature. The resulting multi-dimensional boundary conditions could then be ten-dimensional, with a given boundary existing in portions of any or all of the dimensions corresponding to the training features used. If additional features were used (for a total of n features), the multi-dimensional boundary can also take those features into account, resulting in an n-dimensional boundary.

Figure 6:
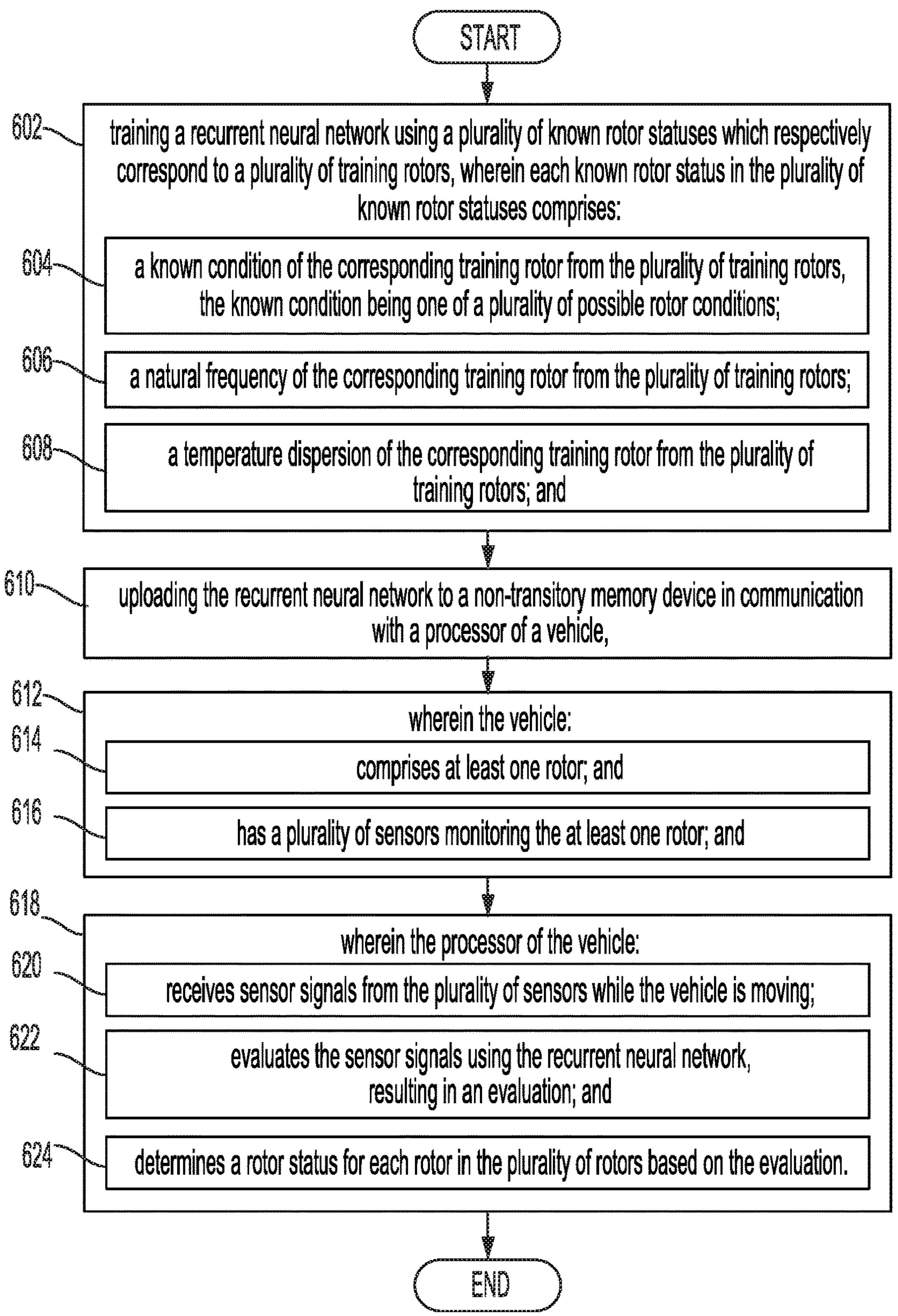
FIG. 6 illustrates an example method embodiment.

FIG. 6 illustrates an example method embodiment for detecting internal cracks in a vehicle brake rotor. As illustrated, the method can include training a recurrent neural network using a plurality of known brake rotor statuses which respectively correspond to a plurality of training brake rotors, wherein each known brake rotor status in the plurality of known brake rotor statuses comprises (602): a known condition of a corresponding training brake rotor from the plurality of training brake rotors, the known condition being one of a plurality of possible brake rotor conditions (604); a natural frequency of the corresponding training brake rotor from the plurality of training brake rotors (606); and a temperature distribution of the corresponding training brake rotor from the plurality of training brake rotors (608).

The method continues by uploading the recurrent neural network to a non-transitory memory device in communication with a processor of a vehicle (610), with the vehicle (612) comprising at least one brake rotor (614) and having a plurality of sensors monitoring the at least one brake rotor (616). The processor for the vehicle (618) receives sensor signals from the plurality of sensors while the vehicle is moving (620), evaluates the sensor signals using the recurrent neural network, resulting in an evaluation (622), and determines a brake rotor status for each at least one brake rotor based on the evaluation (624).

In some configurations, the plurality of sensors can include: a microphone detecting a braking audio frequency of the at least one brake rotor; a thermometer detecting a temperature of the at least one brake rotor; an accelerometer located on a brake caliper of the at least one brake rotor; and a caliper pressure monitor of the brake caliper of the at least one brake rotor.

In some configurations, additional inputs to the processor of the vehicle can include: a wheel velocity of a wheel which can be slowed by a brake associated with the at least one brake rotor; a normal load of the vehicle; a current load of the vehicle; and/or a brake force applied to the at least one brake rotor.

In some configurations, the method illustrated in FIG. 6 can further include generating, prior to the training of the recurrent neural network, a sensitivity analysis on the plurality of known brake rotor statuses, where the training of the recurrent neural network uses the sensitivity analysis.

In some configurations, the plurality of known brake rotor statuses can include, for the natural frequency (also known as the Eigen frequency, or vibration characteristics), and the temperature distribution, data collected over a predetermined amount of time, where the predetermined amount of time is determined before operations of the vehicle. For example, the predetermined amount of time may be thirty minutes, five minutes, thirty seconds, or any other amount of time. In other configurations, the time could be dynamic, such as one tire revolution, two tire revolutions, one braking cycle, etc.

In some configurations, the recurrent neural network defines multidimensional boundary conditions for each of the plurality of possible brake rotor conditions. The number of dimensions can be based on the number of different feature types used to train the recurrent neural network.

Figure 7:
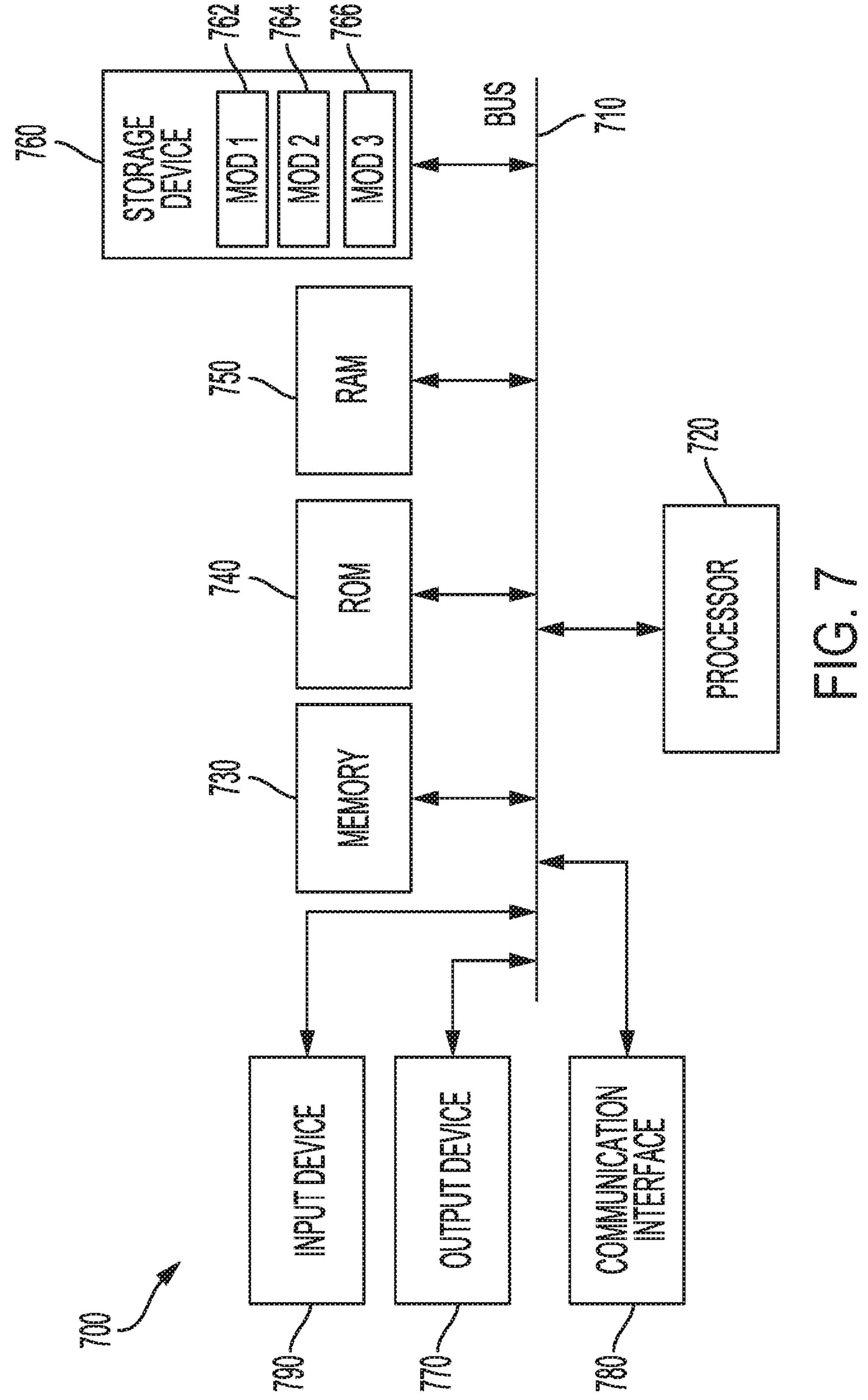
FIG. 7 illustrates an example computer system.

With reference to FIG. 7, an exemplary system includes a general-purpose computing device 700, including a processing unit (CPU or processor) 720 and a system bus 710 that couples various system components including the system memory 730 such as read-only memory (ROM) 740 and random-access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general-purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method, comprising:

training a recurrent neural network using a plurality of known brake rotor statuses which respectively correspond to a plurality of training brake rotors, wherein each known brake rotor status in the plurality of known brake rotor statuses comprises:

a known condition of a corresponding training brake rotor from the plurality of training brake rotors, the known condition being one of a plurality of possible brake rotor conditions, including an intact condition, an internal crack condition, and an external crack condition, the known condition being determined prior to use of sensor data collected from the corresponding training brake rotor, and, for at least some of the plurality of training brake rotors having the internal crack condition, the internal crack condition being quantified using ultrasonic waves;

an Eigen frequency of the corresponding training brake rotor from the plurality of training brake rotors, and a temperature distribution of the corresponding training brake rotor from the plurality of training brake rotors; and uploading the recurrent neural network to a non-transitory memory device in communication with a processor of a vehicle, wherein the vehicle, comprises at least one brake rotor; and has a plurality of sensors monitoring the at least one brake rotor; and wherein the processor of the vehicle receives sensor signals from the plurality of sensors while the vehicle is moving;

evaluates the sensor signals using the recurrent neural network, resulting in an evaluation; and determines a brake rotor status for each of the at least one brake rotor based on the evaluation, the brake rotor status being either an intact condition or an internal crack condition that is not visible during visual inspection.

2. The method of claim 1, wherein the plurality of sensors comprises:

a microphone detecting a braking audio frequency of the at least one brake rotor;

a thermometer detecting a temperature of the at least one brake rotor;

an accelerometer located on a brake caliper associated with the at least one brake rotor; and a caliper pressure monitor of the brake caliper associated with the at least one brake rotor.

3. The method of claim 1, further comprising:

generating, prior to the training of the recurrent neural network, a sensitivity analysis on the plurality of known brake rotor statuses, wherein the training of the recurrent neural network uses the sensitivity analysis.

4. The method of claim 1, wherein the plurality of known brake rotor statuses comprises, for the Eigen frequency and the temperature distribution, data collected over a predetermined amount of time.

5. The method of claim 4, wherein the predetermined amount of time is a minimum of thirty minutes.

6. The method of claim 1, wherein the recurrent neural network defines multidimensional boundary conditions for each of the plurality of possible brake rotor conditions.

7. A vehicle comprising:

at least one brake rotor;

a plurality of sensors associated with the at least one brake rotor;

a processor;

a non-transitory computer-readable memory device having stored therein:

a recurrent neural network which was trained using Eigen frequencies of training brake rotors from a plurality of training brake rotors and using a plurality of known brake rotor statuses which respectively correspond to the plurality of training brake rotors, wherein each known brake rotor status in the plurality of known brake rotor statuses comprises:

a known condition of a corresponding training brake rotor from the plurality of training brake rotors, the known condition being one of a plurality of possible brake rotor conditions, including an intact condition, an internal crack condition, and an external crack condition, the known condition being determined prior to use of sensor data collected from the corresponding training brake rotor, and, for at least some of the plurality of training brake rotors having the internal crack condition, the internal crack condition being quantified using ultrasonic waves;

and a temperature distribution of the corresponding training brake rotor from the plurality of training brake rotors; and instructions which, when executed by the processor, cause the processor to perform operations comprising:

receiving, from the plurality of sensors, sensor signals from the plurality of sensors while the vehicle is moving;

evaluating the sensor signals using the recurrent neural network, resulting in an evaluation; and determining a brake rotor status for each of the at least one brake rotor based on the evaluation, the brake rotor status comprising being either an intact condition or an internal crack condition that is not visible during visual inspection.

8. The vehicle of claim 7, wherein the plurality of known brake rotor statuses comprises, for the Eigen frequency and the temperature distribution, data collected at a predetermined frequency over a predetermined amount of time.

9. The vehicle of claim 8, wherein the predetermined frequency is one hertz.

10. The vehicle of claim 7, wherein the recurrent neural network defines multidimensional boundary conditions for each of a plurality of possible brake rotor conditions.

11. The vehicle of claim 7, wherein the plurality of sensors comprises:

a microphone detecting a braking audio frequency of the at least one brake rotor;

a thermometer detecting a temperature of the at least one brake rotor;

an accelerometer located on a brake caliper associated with the at least one brake rotor; and a caliper pressure monitor of the brake caliper associated with the at least one rotor.

12. The vehicle of claim 7, wherein training of the recurrent neural network uses a sensitivity analysis, the sensitivity analysis generated prior to the training.

13. A non-transitory computer-readable storage medium having stored therein:

a recurrent neural network which was trained, at least in part, using Eigen frequencies of training brake rotors from a plurality of training brake rotors and using a plurality of known brake rotor statuses which respectively correspond to the plurality of training brake rotors, wherein each known brake rotor status in the plurality of known brake rotor statuses comprises;

a known condition of a corresponding training brake rotor from the plurality of training brake rotors, the known condition being one of a plurality of possible brake rotor conditions, including an intact condition, an internal crack condition, and an external crack condition, the known condition being determined prior to use of sensor data collected from the corresponding training brake rotor, and, for at least some of the plurality of training brake rotors having the internal crack condition, the internal crack condition being quantified using ultrasonic waves;

and a temperature distribution of the corresponding training brake rotor from the plurality of training brake rotors; and instructions which, when executed by a processor, cause the processor to perform operations comprising:

receiving, from a plurality of sensors recording data associated with at least one brake rotor of a vehicle, sensor signals from the plurality of sensors while the vehicle is moving;

evaluating the sensor signals using the recurrent neural network, resulting in an evaluation; and determining a brake rotor status for each at least one brake rotor based on the evaluation, the brake rotor status being either an intact condition or an internal crack condition that is not visible during visual inspection.

14. The non-transitory computer-readable storage medium of claim 13, wherein the plurality of known brake rotor statuses comprises, for the Eigen frequency and the temperature distribution, data collected at a predetermined frequency over a predetermined amount of time.

15. The non-transitory computer-readable storage medium of claim 14, wherein the predetermined frequency is one hertz.

16. The non-transitory computer-readable storage medium of claim 13, wherein the recurrent neural network defines multidimensional boundary conditions for each of a plurality of possible brake rotor conditions.

* * * * *